Dec. 28, 1937.  C. D. RUSSELL  2,103,383
CHERRY SPLITTER
Filed Dec. 3, 1934  2 Sheets-Sheet 1
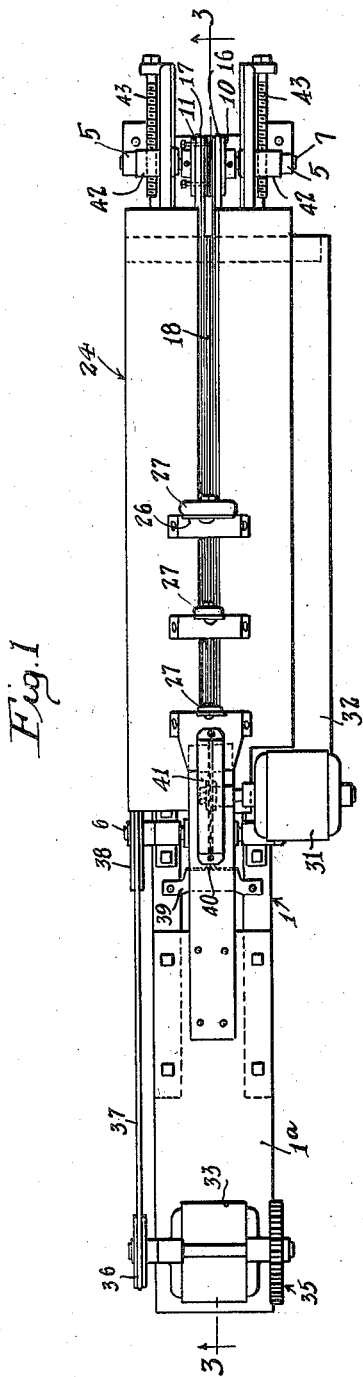
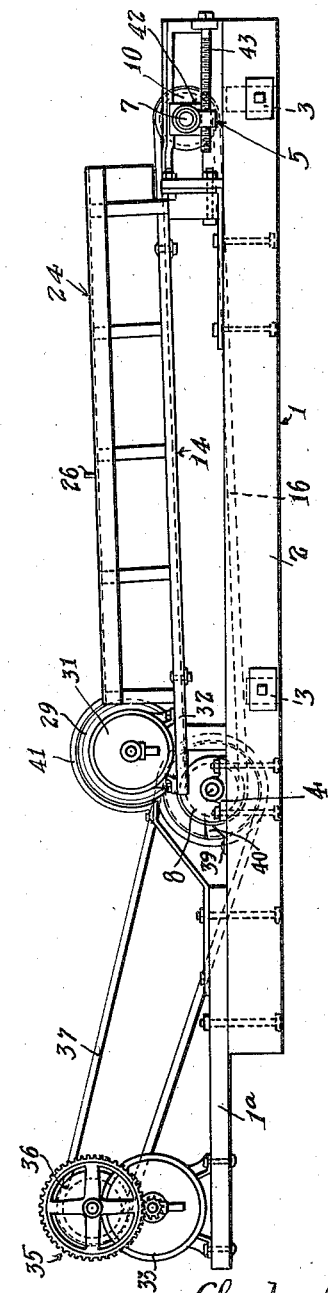
Inventor
Clyde D. Russell
By Lyon & Lyon
Attorneys Dec. 28, 1937.    C. D. RUSSELL    2,103,383
CHERRY SPLITTER
Filed Dec. 3, 1934    2 Sheets-Sheet 2
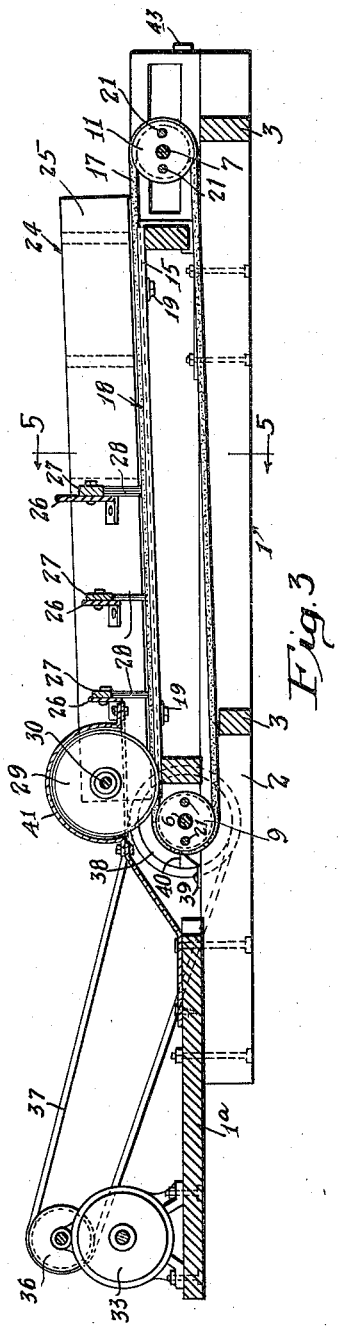
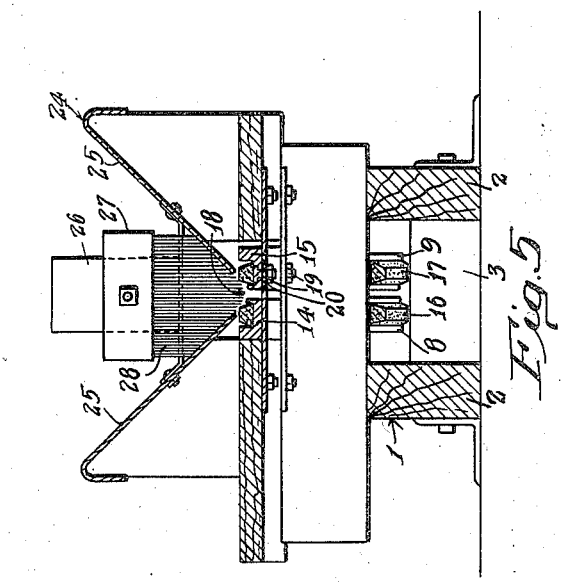
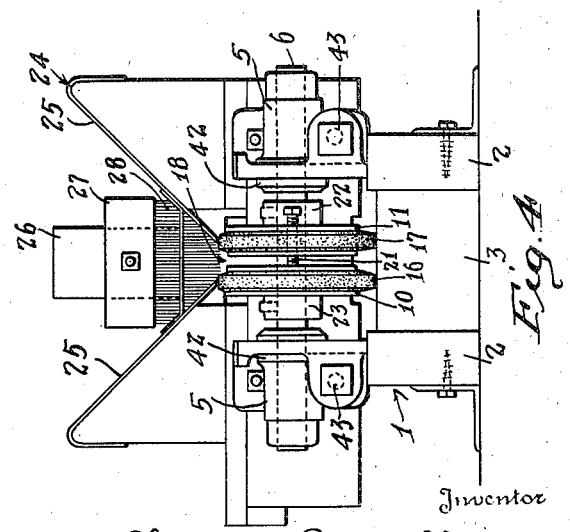
Inventor
Clyde D. Russell
By Lyon & Lyon
Attorneys Patented Dec. 28, 1937

2,103,383

UNITED STATES PATENT OFFICE 2,103,383

CHERRY SPLITTER

Clyde D. Russell, Oakland, Calif., assignor to California Packing Corporation, San Francisco, Calif., a corporation of New York Application December 3, 1934, Serial No. 755,676

2 Claims. (Cl. 146—73)

This invention relates to a machine for the splitting or severing into halves fruit, and particularly cherries.

It is an object of this invention to provide a machine for the halving of fruit such, for example, as cherries, which machine includes a means for cutting the cherries or fruit into halves, and a conveyer mechanism adapted to receive the fruit to separate the fruit into a single file relationship, and to hold the fruit in position for presentation to cutting or splitting mechanism so that all of the fruit will be properly halved.

Other objects and advantages of this invention it is believed will be apparent from the following detailed description of a preferred embodiment thereof as illustrated in the accompanying drawings.

In the drawings:

Figure 1 is a top plan view of a fruit splitting machine embodying my invention.

Figure 2 is a side elevation thereof.

Figure 3 is a sectional side elevation taken substantially on the line 3—3 of Figure 1.

Figure 4 is an end elevation thereof.

Figure 5 is a sectional end elevation taken substantially on the line 5—5 of Figure 3.

In the preferred embodiment of my invention as illustrated in the accompanying drawings, 1 indicates a frame which may be of any suitable or desirable construction which includes frame runners 2 connected together by transverse frame members 3. Mounted on the frame 1 between the frame runners 2 in bearings 4 and 5 are pulley shafts 6 and 7, respectively.

Mounted on the pulley shafts 6 and 7 are belt pulleys 8, 9, 10 and 11 respectively. Mounted on supporting blocks 12 and 13 supported on the frame 1 are belt guide members 14 and 15. Trained over the pairs of pulleys 8 and 10 and 9 and 11, respectively, are belts 16 and 17. The belts 16 and 17 are beveled belts frusto-conical in cross section with converging adjacent side faces, and are mounted in inverted position, that is, with the frusto-conical portions of the cones upwardly away from the pulleys to provide between the spaced belts 16 and 17 a trough 18 which is substantially V-shaped in cross section and into which the fruit is adapted to be delivered.

One of the guides 15 is adjustably mounted in position so that it may be moved to or from the other guide 14 to thereby move the belt 17 to or from the belt 16 to vary the cross-sectional dimension of the trough 18. In order to accomplish this, the guide 15 is secured in position by means of bolts 19 which are mounted through elongated slots 20 formed in the frame structure so that upon loosening of the bolts 19, the guides 15 may be adjusted as desired or required.

In order to maintain the pulleys 10 and 11 and 8 and 9 properly spaced as the guides 15 are adjusted the pulleys are supported upon the shafts 6 and 7 preferably as follows:

The pulleys are secured to the shafts in any suitable or desirable manner so as to rotate with the shafts. In order to maintain the pulleys adjustably spaced as desired, a cap screw 21 is threaded through the flange of one of the pulleys in position to engage the flange of the opposite pulley, thus maintaining pulleys spaced apart. In order that the pulleys will not separate more than the distance determined by the threading of the cap screw 21 through the flange of one of the pulleys, spacing collars 22 and 23 are provided upon the shafts at the outer faces of the pulleys.

In order that the fruit may be properly fed into the groove 18 between the belts 16 and 17, a hopper 24 is provided above the belts 16 and 17 so that by delivering the fruit or cherries into the hopper 24 the fruit is guided down the converging inclined walls 25 of the hopper and into the trough 18 located in the gap between the lower edges of the side walls 25.

In order that the cherries or fruit may be positioned firmly within the trough 18 between the belts 16 and 17 and in single file relation in this trough, yielding means are provided above the conveyer which are adapted to engage and hold back all the cherries or fruit except a line of the fruit that rests directly on the conveyer, and this insures that the fruit will move with the conveyer only in single file relation. In order to accomplish this result, there is mounted upon standards 26 above the conveyer, resisting curtains composed of yielding elements, and preferably consisting of brushes 27, the bristles 28 of which will yield under pressure, and which extend downwardly in substantial conformity with the contour of the sides 25 of the hopper 24 and into the trough 18 to engage and hold back all the cherries except a line of the same resting directly on the conveyer.

These curtains substantially fill the cross-section of the trough and extend down to a point near the conveyer.

The brushes 27 are preferably mounted progressively along the conveyer and in position to insure the positioning of the cherries firmly in position in the trough 18 between the belts 16 and 17. By reason of the fact that the bristles that engage the line of cherries held on the conveyer are longer than the other bristles, they will be relatively more yielding. In other words, by reason of their relative shortness the bristles that are not in contact with the advancing line of cherries will be relatively stiffer and more adapted to perform their function of holding back the cherries not in the line of advance. As the cherries are advanced in single file relation resting directly on the conveyer and firmly held, they are delivered continuously to a rotary cutting blade 29, the periphery of which projects downward into and approximately through the trough 18 so that as the cherries are moved into contact with the rotary cutting blade, they will be cut into halves.

The rotary cutting blade 29 is secured to the shaft 30 of a motor 31, which motor 31 is supported upon the elevated portion 32 of the frame 1. The rotary cutting blade is continuously revolved by the motor 31 and operates the blade 29 to continuously halve the cherries as they are delivered to the blade by the moving conveyer.

In order to drive the conveyer, a motor 33 is mounted on an extension 1ª of the frame 1, and in order to reduce the speed of the motor so that the conveyer will move relatively slowly, a reduction gear drive 35 is provided for driving the drive pulley 36. A belt 37 is trained over the drive pulley 36 and over a driven pulley 38 secured to the shaft 6.

In order to take the halved cherries or fruit away from the blade 29 and out of the V groove 18 formed in the conveyer, a stripper plate 39 is provided which has a V point 40 which propects into the V groove 18 to strip the halved cherries from the conveyer. The halved cherries are then allowed to fall through the frame 1 either into a container or onto a further conveyer for moving the halved cherries to a further processing apparatus.

A blade guard 41 is secured to the frame 1 and extends over the periphery of the sharpened blade 29 to protect the operators.

A belt tightener is provided in order to maintain the belts 16 and 17 in proper tension, and for this purpose the bearings 5 for the shaft 7 are mounted in slide blocks 42 in the end of the frame 1, and adjustment bolts 43 are threaded through the blocks 42 so as to adjustably move the bearings 5 to or from the bearings 4 as required for the purpose of maintaining the proper tension in the belts 16 and 17.

In order to provide for the most efficient operation of the cherry splitting device embodying my invention, it is preferable that the conveyer formed in the belts 16 and 17 be inclined downwardly toward the rotary halving blade 29, as will be apparent from an inspection of Figures 2 and 3 of the drawings.

Having fully described my invention, it is to be understood that I do not wish to be limited to the details herein set forth, but my invention is of the full scope of the appended claims.

I claim:

1. In a machine for halving cherries, the combination of a hopper with converging side walls disposed apart to form a gap at their lower edges, a conveyer supported independently of said side walls and onto which the cherries descend down said walls, the conveyer including inverted V-shaped belts mounted in spaced relation to provide in conjunction with said converging side walls, a V-trough with downwardly converging faces, spaced apart grooved pulleys over which the belts are trained, means for relatively adjusting the spaced pulleys to vary the transverse dimension of the groove between the belts, a plurality of yielding curtains located within the trough substantially filling the cross section of the trough at its bottom and extending down to a point near the conveyer for engaging and holding back the cherries except a line of cherries within the V trough and supported directly by the belts in single file relation, a rotary splitting blade positioned over the conveyer with its periphery projecting into the trough, the converging side walls of the hopper and the conveyer extending continuously up to the cutter, and means for driving the rotary splitting blade to split the fruit as the same is conveyed by the conveyer past the rotary blade in single file relation.

2. In a machine for halving cherries, the combination of a hopper with converging side walls disposed apart to form a gap at their lower edges, a conveyer supported independently of said side walls and onto which the cherries descend down said walls, the conveyer including inverted V-shaped belts mounted in spaced relation to provide in conjunction with said converging side walls, a V trough with downwardly converging faces, spaced apart grooved pulleys over which the belts are trained, a plurality of yielding curtains located within the trough substantially filling the cross section of the trough at its bottom and extending down to a point near the conveyer for engaging and holding back the cherries except a line of cherries within the V trough and supported directly by the belts in single file relation, a rotary splitting blade positioned over the conveyer with its periphery projecting into the trough, the converging side walls of the hopper and the conveyer extending continuously up to the cutter, and means for driving the rotary splitting blade to split the fruit as the same is conveyed by the conveyer past the rotary blade in single file relation.

CLYDE D. RUSSELL.